Jan. 1, 1957  M. FRESARD ET AL  2,775,884
CYLINDER DEVICE, PARTICULARLY FOR A SAFETY LOCK
Filed May 14, 1953
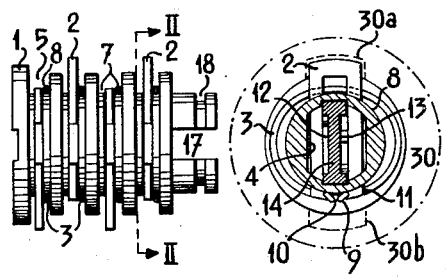
Fig.1  Fig.2  Fig.3
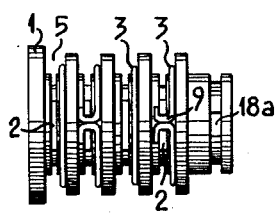 
Fig.5  Fig.4
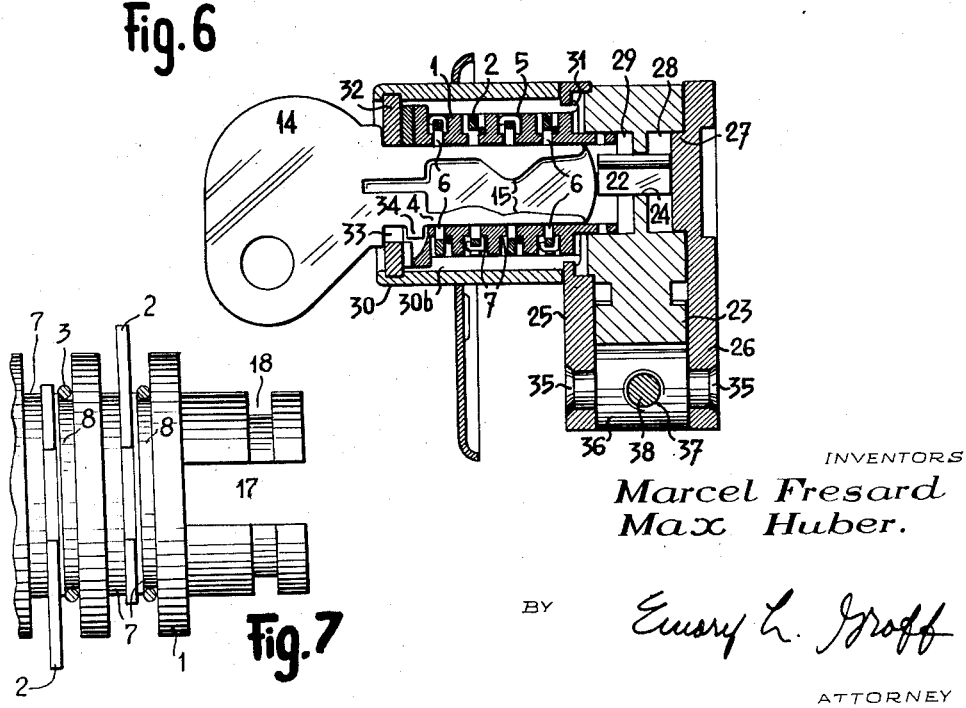
Fig.6
Fig.7
INVENTORS
Marcel Fresard
Max Huber.
BY Emery L. Groff
ATTORNEY

United States Patent Office 2,775,884
Patented Jan. 1, 1957

2,775,884

CYLINDER DEVICE, PARTICULARLY FOR A SAFETY LOCK

Marcel Fresard and Max Huber, Geneva, Switzerland, assignors to Mefina S. A., Fribourg, Switzerland, a Swiss company Application May 14, 1953, Serial No. 354,995

Claims priority, application Switzerland May 20, 1952

3 Claims. (Cl. 70—364)

The present invention has for its subject a cylinder device particularly for a safety lock, of the type comprising a cylinder carrying locking plates capable of sliding transversely in the cylinder against the action of springs of general annular shape, the cylinder having an axial bore of substantially rectangular cross-section, the outer wall of the cylinder having as many grooves as it has plates, the bottom of said grooves having two oppositely located openings through which passes the corresponding plate.

This device is characterised in that two annular shoulders are provided opposite one another on the opposite faces of each groove, a spring of general annular shape being located in each groove and being guided in this by bearing against one of the two shoulders, the two ends of each spring being curved and hooked to the same side of each plate, the second shoulder being provided for the passage of the bent ends of the spring.

One form of construction of the device according to the invention is shown by way of example in the accompanying drawings, wherein:

Fig. 1 is a view in side elevation of the cylinder.
Fig. 2 is a section on the line II—II of Fig. 1.
Fig. 3 is an end view of the cylinder.
Fig. 4 shows a detail.
Fig. 5 is a plan view of the cylinder.
Fig. 6 shows, in axial section, a safety lock in which is mounted the cylinder shown in Fig. 1.
Figure 7 is an enlarged view in side elevation of the right hand portion of the cylinder shown in Figure 1.

The cylinder device, particularly for a safety lock, comprises a cylinder 1 carrying the plates 2 serving as locking members. Said plates 2 are capable of sliding transversely in the cylinder 1 against the action of springs 3. The body of the cylinder has an axial bore 4 of substantially rectangular cross-section and its outer wall has as many grooves 5 as the cylinder has plates 2. The bottom of each groove 5 has two opposed openings 6 through which passes the corresponding plate 2.

Two annular shoulders 7, of which one has a groove 8, are provided opposite one another on the opposite faces of each groove 5. The springs 3, which are of annular shape, are located in each groove 5. Each of said springs 3 bears against the shoulder 7 having the groove 8 and is guided in the said groove 8, which is clearly shown in detail in Figures 1 and 7, the latter figure showing the grooves 8, the shoulders 7, and the springs 3 in greater detail.

The ends 9 of each spring 3 are bent and hooked on the same side of each plate in a notch 10 thereof (see Figs. 2 and 5). The shoulder 7 not provided with a groove is only provided for the passage of the bent ends 9 of each spring 3.

Each plate 2 has a shoulder 11 forming the stop determining the position of each plate transversely in the cylinder. Further, each plate has a central opening 12 into which projects a pin 13.

The opening 12 has a shape corresponding with that of the cross-section of the key 14 and the pin 13 is adapted to provoke, in co-operation with one of the ramps 15 (see Fig. 6) provided on the lateral faces of the key, the retraction of the corresponding plate in the cylinder 1 when the key is fitted into this.

It is to be observed, on the other hand, that for guiding the key in the cylinder, the axial opening of this is provided on its two opposite sides of smaller width, with a groove 16 in which the key slides.

When the key is withdrawn from the cylinder 1, the plates 2 under the action of the springs 3, move transversely in the cylinder 1 and the side thereof, opposite to that in which the notch 10 is formed, projects either into a groove 30a or into a groove 30b, provided in the casing (Fig. 6). In this position, the plates 2 thus lock the cylinder 1 relatively to the casing 30.

On the contrary when the key engages with the cylinder 1, the ramps 15, by coming into contact with the pin 13 of each of the plates 2, produce the retraction of these into the interior of the cylinder 1. This is thus released and can be driven in rotation.

The end of the cylinder opposite the key has a transverse groove 17 perpendicular to the large sides of the axial opening 4 of substantially rectangular cross-section. An annular groove 18 is also provided in the outer wall of the cylinder and the grooves 16 form two opposed openings 18a in the bottom of the groove 18. The groove 18 and said openings 18a are provided for the case in which the cylinder device is adapted to move a bolt by means of an interposed transmission member, one end of the latter being provided of enlarged shape so as to be capable of being introduced into the groove 17 and to be retained in this by an annular spring engaging with the groove 18 and of which one end is hooked in one of the openings 18a.

Fig. 6 shows, in axial section, a lock, which is fully described as to its structure and operation in copending application Serial No. 354,999, filed May 14, 1953, by applicants here, in which the cylinder 1 is adapted to drive, through the medium of a transmission member 22, a control catch of a bolt not shown and which is assumed to be fitted into a door. Said transmission member 22 is formed by a shaped part of which one end engages with the transverse groove 17, provided at the end of the cylinder 1, whilst the other end of the part 22 engages with a seating 24 of corresponding shape, provided in the catch 23.

It is to be observed that the catch 23 is guided between two flanges 25 and 26, the latter having a cylindrical projection 27 engaging with a bore 28 of the catch.

The inner end of the cylinder 1 itself engages with a bore 29 opposite the bore 28.

The cylindrical casing 30 in which the cylinder 1 turns is secured to the flange 25 by reason of the bent edge 31. The cylinder 1 is itself held in the casing 30 by a washer 32 forced into the outer end of the said casing. It is to be observed that the said washer 32 has a notch 33 which is provided so as to allow of the passage of a pin 34 provided on the key. The pin 34 prevents the key from being introduced into the cylinder or withdrawn therefrom in an incorrect position. Thus when the key is withdrawn from the cylinder, the plates 2 are engaged effectively with the grooves 30a and 30b of the casing 30.

A spacing member 36 holds the plates 25, 26 and the catch 23 in position, by reason of two extensions 35 passing through the plates 25 and 26 and which are riveted against each plate.

The spacing member 36 is itself provided with a screw-threaded bore 37 adapted to receive the screw 38 for securing the cylinder-catch block in the portion of the lock in which the bolt, not shown, slides.

The lock shown in Fig. 6 only represents one example of the application of the cylinder device described.

This device may, in fact, be applied to all types of locks comprising either a bolt driven by means of a transmission member, or a bolt encased in a door and actuated by a catch which itself is also moved by means of a transmission member. Various applications of the said cylinder device have been shown and described in application Serial No. 354,999, filed May 14, 1953, by applicants here.

It is to be observed that the cylinder device may also be applied to padlocks. Such an application is described in application Serial No. 354,998, filed May 14, 1953, by Marcel Fresard.

In a modification, it will be understood that the end of the cylinder 1, opposite the key, instead of having the shape shown in the various figures of the drawing may have a different shape according to the lock or padlock to which the device is adapted to be applied.

We claim:

1. A cylindrical device adapted to be used in a safety lock, comprising a cylindrical body having a generally rectangular cross-sectional bore therethrough, a plurality of axially spaced and circumferential grooves in the outer surface of the wall of said body, the bottom wall of each groove having two oppositely positioned orifices therein, each of said orifices extending through the cylinder wall from the wall surface of the bore to the bottom portion of each groove, the opposite faces of each groove having an annular shoulder, one opposite to the other, one of said shoulders having a second groove therein, a plurality of slidably mounted locking plates having central openings and spaced pins extending into said openings from the inner plate walls thereof, each of said plates being positioned transversely in said cylindrical body with respect thereto and in said orifices, and an annularly shaped spring means in each of said grooves and guided in each of said second grooves for urging said plates transversely in said cylindrical body.

2. A cylindrical device adapted to be used in a safety lock, comprising a cylindrical body having a generally rectangular cross-sectional bore therethrough, a plurality of axially spaced and circumferential grooves in the outer surface of the wall of said body, the bottom wall of each groove having two oppositely positioned orifices therein, each of said orifices extending through the cylinder wall from the wall surface of the bore to the bottom portion of each groove, the opposite faces of each groove having an annular shoulder, one opposite to the other, one of said shoulders having a second groove therein, a plurality of slidably mounted locking plates having central openings and spaced pins extending into said openings from the inner plate walls thereof, each of said plates being positioned transversely in said cylindrical body with respect thereto and in said orifices, each of said plates having notch means for receiving the end of a spring on the outer plate walls thereof, and an annularly shaped spring means in each of said grooves and guided in each of said second grooves for urging said plates transversely in said cylindrical body, each of said springs having the end thereof hooked into said notch means.

3. A cylindrical body device adapted to be used in a safety lock, comprising a cylindrical body having a generally rectangular cross-sectional bore therethrough having short sides and long sides constituting the inner surfaces of the walls of said cylindrical body, a plurality of axially spaced and circumferential grooves in the outer surface of the wall of said cylindrical body, the bottom wall of each groove having two oppositely positioned orifices therein, each of said orifices extending through the cylinder wall from the wall surface of the bore to the bottom portion of each groove, the opposite faces of each groove having an annular shoulder, one opposite to the other, one of said shoulders having a second groove therein, a plurality of slidably mounted locking plates having central openings and spaced pins extending into said openings from the inner plate walls thereof, each of said plates being positioned transversely in said cylindrical body with respect thereto and in said orifices, and an annularly shaped spring means in each of said grooves and guided in each of said second grooves for urging said plates transversely in said cylindrical body, said cylindrical body having at its end portion in the wall thereof a transverse groove perpendicular to the long sides of the said bore and an annular groove in the outer wall thereof for allowing attachment to said body of a transmission member for operating catches and bolts.

References Cited in the file of this patent

UNITED STATES PATENTS

| | | |
|---|---|---|
| 1,328,074 | Bennett | Jan. 13, 1920 |
| 1,352,239 | Baird | Sept. 7, 1920 |
| 1,908,701 | Falk | May 16, 1933 |
| 2,232,137 | Rolph | Feb. 18, 1941 |
| 2,587,739 | Kunz | Mar. 4, 1952 |